United States Patent
Johnsen et al.

(10) Patent No.: US 7,939,219 B2
(45) Date of Patent: May 10, 2011

(54) CARBONATE FUEL CELL AND COMPONENTS THEREOF FOR IN-SITU DELAYED ADDITION OF CARBONATE ELECTROLYTE

(75) Inventors: Richard Johnsen, Waterbury, CT (US); Chao-Yi Yuh, New Milford, CT (US); Mohammad Farooque, Danbury, CT (US)

(73) Assignee: FuelCell Energy, Inc., Danbury, CT (US)

(*) Notice: Subject to any disclaimer, the term of this patent is extended or adjusted under 35 U.S.C. 154(b) by 1008 days.

(21) Appl. No.: 11/139,758

(22) Filed: May 27, 2005

(65) Prior Publication Data
US 2006/0269830 A1 Nov. 30, 2006

(51) Int. Cl.
*H01M 6/30* (2006.01)
*H01M 8/00* (2006.01)

(52) U.S. Cl. .......................... 429/535; 429/110
(58) Field of Classification Search .............. 429/110, 429/535
See application file for complete search history.

(56) References Cited

U.S. PATENT DOCUMENTS

| | | | |
|---|---|---|---|
| 4,389,467 A * | 6/1983 | Singh et al. ............ | 429/41 |
| 4,530,887 A | 7/1985 | Maru et al. | |
| 4,591,538 A | 5/1986 | Kunz | |
| 4,898,793 A | 2/1990 | Matsumura et al. | |
| 4,980,248 A | 12/1990 | Fujita | |
| 5,468,573 A * | 11/1995 | Bregoli et al. ........... | 429/16 |
| 5,563,003 A | 10/1996 | Suzuki et al. | |
| 5,773,161 A * | 6/1998 | Farooque et al. ........ | 429/34 |
| 6,379,833 B1 | 4/2002 | Hill et al. | |
| 6,844,102 B2 * | 1/2005 | Allen et al. ............... | 429/46 |
| 6,890,679 B2 * | 5/2005 | Johnsen et al. .......... | 429/40 |
| 2003/0162082 A1 | 8/2003 | Allen et al. | |
| 2004/0202921 A1 * | 10/2004 | Allen ........................ | 429/80 |

FOREIGN PATENT DOCUMENTS

| | | |
|---|---|---|
| JP | 62-165871 | 7/1987 |
| JP | 62-295357 | 12/1987 |
| JP | 64-089150 | 4/1989 |
| JP | 01-183069 | 7/1989 |
| JP | 01183069 A * | 7/1989 |
| JP | 01-195669 | 8/1989 |
| JP | 01-279571 | 11/1989 |
| JP | 02-024970 | 1/1990 |
| JP | 02-144856 | 6/1990 |
| JP | 04-073866 | 3/1992 |
| JP | 05-109421 | 4/1993 |
| JP | 08-045524 | 2/1996 |
| JP | 08-069807 | 3/1996 |
| JP | 08-153529 | 6/1996 |
| JP | 08-321318 | 12/1996 |
| JP | 09-073909 | 3/1997 |

* cited by examiner

*Primary Examiner* — Karie O'Neill Apicella
(74) *Attorney, Agent, or Firm* — Cowan, Liebowitz & Latman, P.C.

(57) ABSTRACT

An apparatus and method in which a delayed carbonate electrolyte is stored in the storage areas of a non-electrolyte matrix fuel cell component and is of a preselected content so as to obtain a delayed time release of the electrolyte in the storage areas in the operating temperature range of the fuel cell.

25 Claims, 5 Drawing Sheets

US 7,939,219 B2

CARBONATE FUEL CELL AND COMPONENTS THEREOF FOR IN-SITU DELAYED ADDITION OF CARBONATE ELECTROLYTE

STATEMENT AS TO RIGHTS TO INVENTIONS MADE UNDER FEDERALLY SPONSORED RESEARCH AND DEVELOPMENT

This invention was made with Government support under contract DE-FG02-95ER81966 awarded by the Department of Energy. The Government has certain rights in the invention.

BACKGROUND OF THE INVENTION

This invention relates to fuel cells and, in particular, to replenishment of electrolyte in molten carbonate fuel cells.

A fuel cell is a device that directly converts chemical energy stored in hydrocarbon fuel into electrical energy by means of an electrochemical reaction. Generally, a fuel cell comprises an anode and a cathode separated by an electrolyte, which serves to conduct electrically charged ions. In order to produce a useful power level, a number of individual fuel cells are stacked in series with an electrically conductive separator plate between each cell.

Molten carbonate fuel cells (MCFCs) operate by passing a reactant fuel gas through the anode, while oxidizing gas is passed through the cathode. The anode and the cathode of MCFCs are isolated from one another by a porous electrolyte matrix, which may comprise a plurality of layers saturated with carbonate electrolyte. Typical MCFC designs include carbonate electrolyte stored in non-electrolyte matrix components such as the pores of the anode and cathode and in gas passages formed in the anode and cathode current collectors or the bipolar separator plates. The carbonate electrolyte melts during the initial heat up of the fuel cell and redistributes among the pores of the anode, the cathode and the electrolyte matrix due to the capillary forces of the pores. The maximum amount of electrolyte inventory allowed in the beginning of fuel cell life is limited because excess electrolyte in the fuel cell results in poor cell performance due to electrolyte flooding of the anode and the cathode pores.

During MCFC operation, the electrolyte in the cells is consumed by corrosion and lithiation reactions with the cell components and through evaporation. Electrolyte loss in the cells may increase electrode polarization and the ohmic resistive loss across the electrolyte matrix. Moreover, drying of the electrolyte matrix eventually leads to gas cross-over and cell failure.

FIG. 1 shows a graph of relative electrolyte inventory in a MCFC system at various operating times. As shown in FIG. 1, a significant amount, i.e. about 10%, of electrolyte is consumed during the first 2,000 hours of MCFC operation. This occurs due to surface corrosion of the fuel cell components, particularly of the cathode current collector and the bipolar separator plate. The electrolyte loss during the first 2,000 hours of operation, unless replenished, results in a 30%, or about 20,000 hour, reduction in cell life. Accordingly, as can be seen from FIG. 1, the serviceable lifetime of MCFCs is limited by the electrolyte inventory of the cells.

Replenishing of the electrolyte in the MCFCs after 2000 hours of operation can increase the operating life of the fuel cell system by approximately 2 years. As a result, various methods of providing additional electrolyte to the matrix and of replenishing electrolyte in the cells internally and externally have been developed. For example, U.S. Pat. No. 5,468,573 discloses a method of providing additional electrolyte to the matrix internally by packing the current collector recesses with electrolyte paste consisting of 70% carbonate powder and 30% carrier vehicle. When the system of the '573 patent is heated to operating temperatures, the electrolyte paste in the current collector decomposes by driving off the carrier and melted carbonate electrolyte is absorbed into the electrolyte matrix and electrode plates.

Another method of providing additional electrolyte and also of supplementing MCFCs with electrolyte is disclosed in U.S. Pat. No. 5,563,003. The '003 patent teaches loading a plurality of sealed soluble containers filled with electrolyte in the corrugated separator plate of the MCFC. These sealed containers are formed so as to dissolve from their inner walls to release supplementary electrolyte into the cell during fuel cell operation at approximately the time when the electrolyte in the cell becomes deficient.

Another technique for adding electrolyte to the matrix of a carbonate fuel cell is disclosed in Japanese Patent Application Laid Open Number 01-183069. In this technique, the electrolyte matrix includes four matrix layers and multiple carbonate layers situated between the matrix layers. A first carbonate layer having a melting point of 489° C. is situated between the second and third matrix layers and a second carbonate layer having a melting point of about 600° C. is inserted between the third and fourth matrix layers. The fuel cell temperature is raised to the melting point of the first carbonate layer and this layer melts into the matrix layers with the cell being operated at a first operating temperature of 550° C. When the performance of the fuel cell decreases due to consumption of the electrolyte, the cell operating temperature is raised to 600° C. so that the second carbonate electrolyte layer melts into the matrix layers.

Although some of these methods have been helpful in maintaining sufficient electrolyte levels in MCFCs, the methods are difficult to implement, require multiple carbonate layers and multiple operating temperatures and additionally require operational downtime for servicing, all of which increase system manufacturing costs. In particular, the use of small stainless steel electrolyte storage containers in the fuel cell system to provide supplemental electrolyte to the cells, as disclosed in the '003 patent, results in increased material and manufacturing costs. Moreover, the method described in the '573 patent provides additional electrolyte to the system during the start-up of the system without delaying the addition of electrolyte until after some of the electrolyte inventory is lost during operation. Finally, the technique of '069 Japanese published patent application requires multiple carbonate layers in the electrolyte matrix and changes in the operating temperature of the fuel cell.

It is therefore an object of the present invention to provide an apparatus and method for delayed addition of electrolyte to a fuel cell to replace electrolyte lost during the fuel cell operation.

It is a further object of the present invention to provide an apparatus and method adapted to provide additional electrolyte to a fuel cell, which is easy to implement and does not result in significant cost increases.

SUMMARY OF THE INVENTION

In accordance with the principles of the present invention, the above and other objectives are realized in an apparatus and method in which a delayed carbonate electrolyte is stored in the storage areas of a non-electrolyte matrix fuel cell component and is of a pre-selected content so as to obtain a delayed time release of the electrolyte in the storage areas in the operating temperature range of the fuel cell (as used herein the term "release" means changing from a solid to a liquid or flowable state). This contrasts with the electrolyte in the electrolyte matrix of the fuel cell in which release occurs when the fuel cell reaches its operating temperature.

In accord with the invention, the stored delayed addition carbonate electrolyte is of a content such that its melting point is higher than that of the highest temperature in the operating temperature range of the fuel cell. In further accord with the invention, the delayed addition electrolyte includes electrolyte of different content having different melting points, all higher than that of the highest temperature in the operating temperature range of the fuel cell, and stored in different storage areas of the non-electrolyte matrix fuel cell component based on the different content, to obtain the desired time release.

In the forms of the invention to be disclosed hereinafter, the delayed addition carbonate electrolyte comprises a predetermined amount of a pure carbonate salt or predetermined amounts of different pure carbonates salts, such as lithium carbonate or sodium carbonate, and is stored in storage areas of the current collector of the fuel cell. The storage areas include the active area and/or wet seal areas of the current collector, which, preferably, is a cathode current collector.

In accord with the invention, a method of fabricating a current collector with delayed addition carbonate electrolyte is also disclosed.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
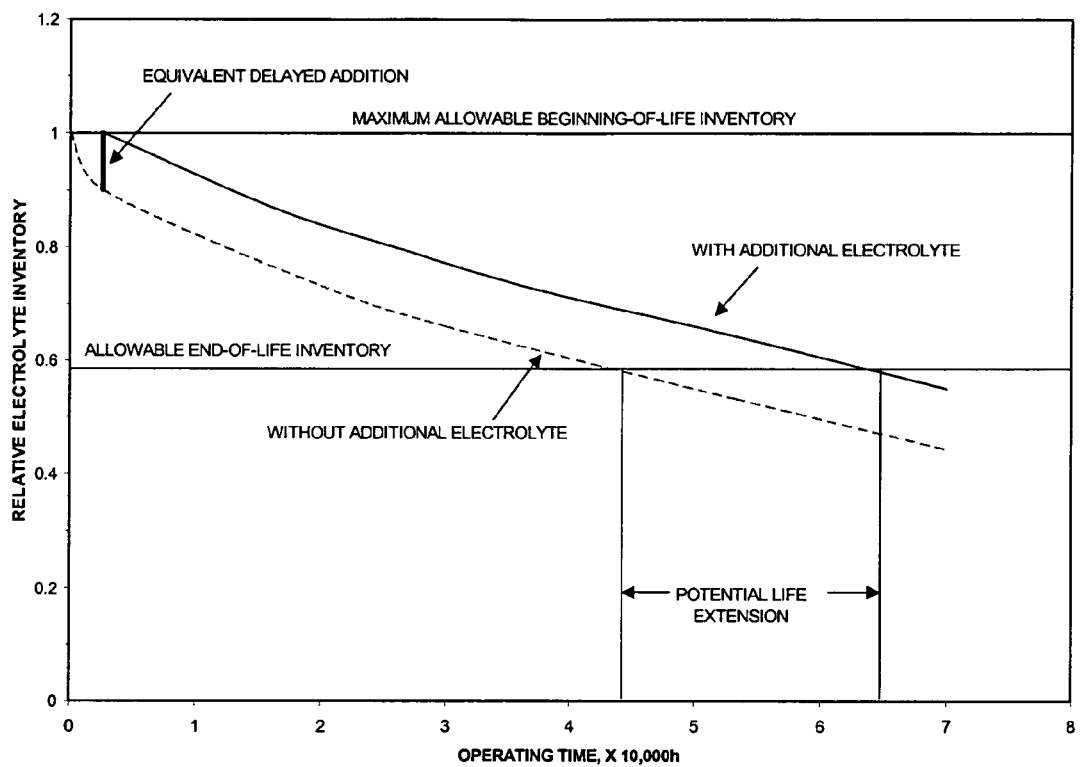
FIG. 1 shows a graph of relative electrolyte inventory at various operating times of a molten carbonate fuel cell.
Figure 2:
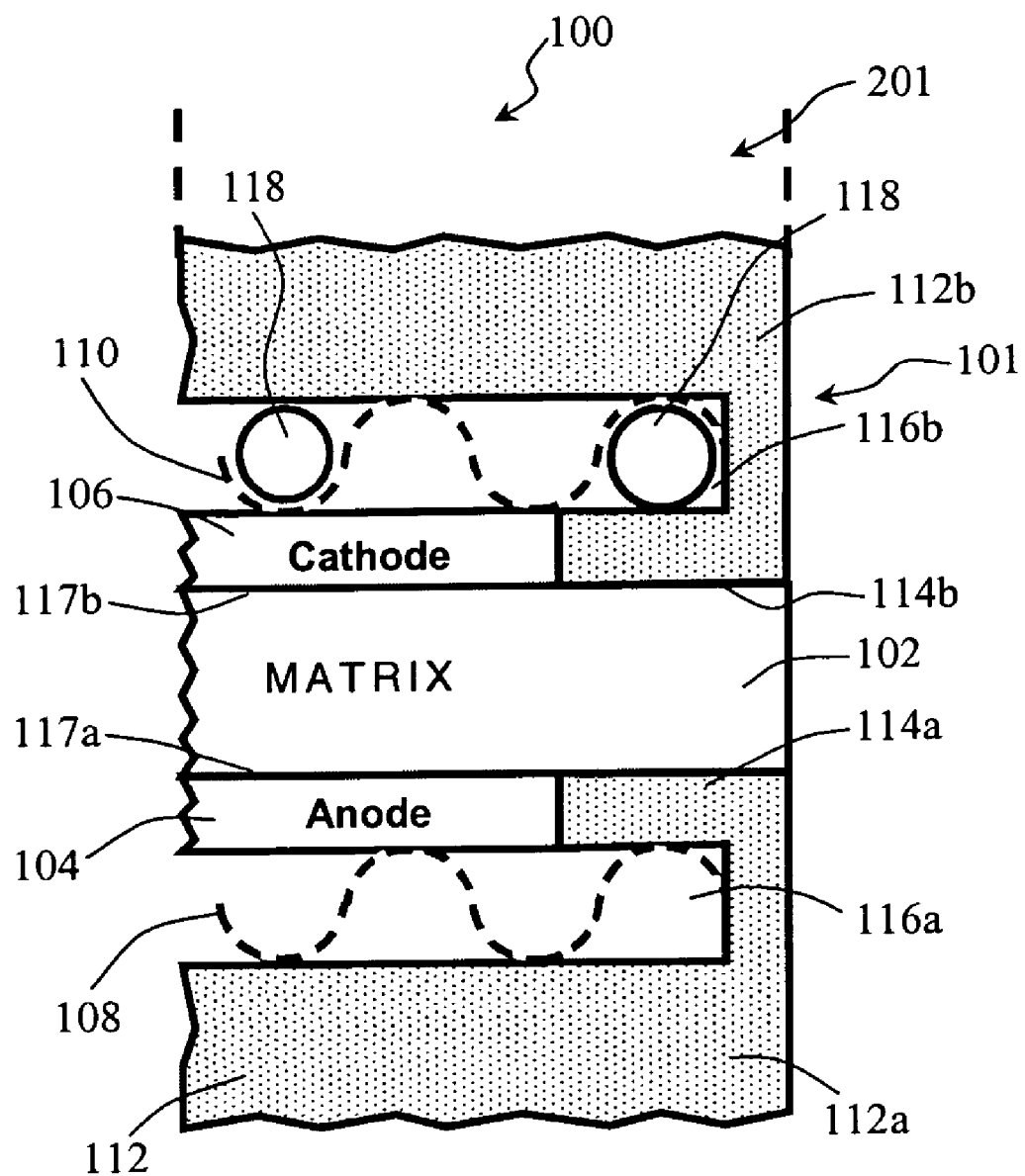
FIG. 2 is a schematic cross-sectional view of a molten carbonate fuel cell adapted to include delayed addition electrolyte in accord with the present invention.

FIG. 2 shows a cross-sectional schematic view of a section of a molten carbonate fuel cell assembly 100 including a number of like fuel cells 101, 201, . . . , etc. The latter fuel cells 101, 201, . . . , etc. are stacked together to form the MCFC assembly 100. While FIG. 2 only shows the complete makeup of the fuel cell 101 and the discussion to follow is directed to this fuel cell, it is understood that the other fuel cells in the assembly 100 are of like construction and the description of the fuel cell 101 applies to these other cells as well.

More particularly, in accord with the invention, the fuel cell 101 is adapted to store, in storage areas of a non-electrolyte matrix of the cell, a delayed addition carbonate electrolyte of content pre-selected such that a desired delayed time release of the delayed addition electrolyte occurs with subsequent transport of the electrolyte from the cell storage areas to the matrix 102 of the cell 101. The construction of the cell 101 including the delayed addition electrolyte will be discussed at length herein below.

As shown, the fuel cell 101 includes an anode electrode 104 and a cathode electrode 106 separated by the electrolyte matrix 102. The cell 101 also includes an anode current collector 108 and a cathode current collector 110, which form gas passages for the fuel gas and the oxidant gas, respectively. In this case, the anode and cathode current collectors 108, 110 are each corrugated.

The electrolyte matrix 102, formed from a porous ceramic material, contains an amount of desired or baseline carbonate electrolyte during initial operating stages of the fuel cell life. It is this baseline carbonate electrolyte which is gradually lost during fuel cell operation and which is to be supplemented with the later released delayed addition electrolyte in accordance with the invention.

The baseline electrolyte is stored in solid form in the pores of the matrix and the anode and cathode electrodes 104, 106 and in pre-selected passages of the anode and cathode current collectors 108, 110, and is of a content so that it has a melting point that is reached as the fuel cell is brought to or within its operating temperature range. As a result, the solid baseline electrolyte releases or liquefies and flows in and into the matrix 102 upon bringing the fuel cell 101 to its desired operating temperature. Typically, the baseline carbonate electrolyte is a eutectic or an off-eutectic mixture of carbonates which is solid at ambient temperatures and liquid at the desired carbonate fuel cell operating temperatures in the range of between 570 and 700° Celsius. As is well known, a typical mixture of carbonate electrolytes is a eutectic mixture of potassium and lithium carbonate containing 62 mole % of $Li_2CO_3$ and 38 mole % of $K_2CO_3$.

As shown, the assembly 100 also includes a number of electrically conductive separator plates 112, also called bipolar separator plates, each of which forms a part of adjacent cells in the assembly 100. In particular, each bipolar separator plate 112 is used to separate the anode electrode of one cell and the cathode electrode of the adjacent cell, and to provide electrical contact with the current collectors in these cells.

FIG. 2 shows a portion of a first separator plate 112a formed adjacent to the anode current collector 108 and the anode electrode 104 of the cell 101, and a portion of a second separator plate 112b formed adjacent to the cathode current collector 110 and the cathode electrode 106 of the cell 101. As illustrated, the separator plates 112a, 112b include pocket areas 114a, 114b, respectively, formed by folding the opposite edges of each plate over the anode surface and over the cathode surface of the plate.

The pocket area 114a defines an anode wet seal area 116a, while the pocket area 114b defines a cathode wet seal area 116b. These wet seal areas 116a, 116b are inactive areas where no power is produced and which provide gas tightness around the periphery of the fuel cell 101. The wet seal areas 116a, 116b abut active areas 117a, 117b of the cell which house the anode electrode 104 and the cathode electrode 106, respectively. As can be seen, the current collectors 108, 110 are disposed along the active areas 117a, 117b and extend into the wet seal areas 116a, 116b formed by the plates 112a, 112b.

The gas passages formed by the cathode current collector 110 are used as storage areas to store solid delayed addition carbonate electrolyte 118 which, in accord with the invention and as mentioned above and will be discussed more fully below, is of a preselected content to provide delayed time release and addition of carbonate electrolyte to the cell after the baseline carbonate electrolyte in the cell starts to be consumed. In this way, the stored electrolyte 118 provides delayed continuous replenishing of the liquid electrolyte inventory of the cell 101 so that cell life is enhanced.

In the case shown, the delayed addition electrolyte 118 is stored in the current collector in the active area 117b as well as in the wet seal area 116b. To prevent premature addition of the electrolyte 118 to the active components of the cell, i.e. cathode electrode, electrolyte matrix and anode electrode, the electrolyte 118 is preferably placed in the passages of the current collector 110 where there is no direct contact between the electrolyte 118 and the baseline electrolyte, which, as above-indicated, melts or liquefies during the initial heat-up of the fuel cell 101 to its operating temperature.

In accordance with the invention, the delayed addition carbonate electrolyte 118 is a solid electrolyte and of preselected content such that it differs from the content of the baseline carbonate electrolyte so as to have a melting point higher than the highest temperature in the operating temperature range of the fuel cell 101. The higher melting point of the electrolyte 118 prevents it from releasing or melting with the baseline electrolyte during the initial operation or heat-up of the cell 101 and thereby prevents flooding of the cathode electrode 106 with excess electrolyte. Instead, the higher melting point allows the electrolyte 118 to slowly liquefy only after a portion of the baseline electrolyte has been consumed and needs replenishment.

The delayed addition electrolyte can be provided by a carbonate electrolyte in pure form having the higher melting point. It can also be provided by an off-eutectic carbonate whose eutectic part has a melting point within the operating temperature range of the fuel cell. In the latter case, the eutectic part melts and flows into the cathode pores during the time that the fuel cell reaches its operating temperature, leaving the higher melting point carbonate part which forms the delayed addition electrolyte and undergoes delayed addition over time, as above-discussed.

As the delayed addition electrolyte 118, solid carbonate electrolytes having a melting point higher than the highest internal operating temperature (>680° C.) can be used. Carbonate electrolytes, such as $Li_2CO_3$ and $Na_2CO_3$, are preferable.

Also, off-eutectic electrolytes containing $Li_2CO_3$ and $Na_2CO_3$ or $K_2CO_3$ can be used to realize the delayed addition electrolyte. The off-eutectic electrolytes may be formed by mixing appropriate amounts of powder of the respective electrolytes components together. Alternatively, the component powders can be melted together, the melt solidified and then grinded to form off-eutectic powder.

In the case of the Li/K binary electrolytes, the off-eutectic can be comprised of the eutectic (62Li/38K) to which is added any and all amounts of extra $Li_2CO_3$. The range for Li/K off-eutectics is therefore 63 to 100% Li (balance K). In the case of the Li/Na binary electrolytes, the off-eutectic can be comprised of the eutectic (52Li/48Na) to which, in this case, is added any and all amounts of extra $Li_2CO_3$. The range is therefore 53 to 100% Li (balance Na). It may also be comprised of the eutectic (52Li/48Na) plus any and all amounts of extra $Na_2CO_3$, which is useful in the hotter regions of the cell since it absorbs at higher temperatures than $Li_2CO_3$. The range is therefore 49 to 100% Na (balance Li).

The delayed addition electrolyte 118 may be in various solid forms, including paste, granular particles or in pores of porous ceramic pellets. More particularly, the delayed addition electrolyte 118 may be formed as a paste by mixing pure carbonate electrolyte powder with a binder such as, for example, an organic binder. The electrolyte paste can then be applied directly to selected passages of the cathode current collector 110 in a row pattern.

As above-noted, the delayed addition electrolyte 118 stays in solid form in the current collector passages of the fuel cell for a relatively long period of time, i.e. >2000 hours at 620° C. local internal operating temperature, after initial start-up and operation of the fuel cell 101 at its operating temperature before starting to gradually release or melt and then flow into the pores of the cathode electrode 106. More particularly, with the passage of time, the liquid baseline electrolyte present in the pores of the cathode electrode 106 wicks onto the surface of the cathode current collector 110 to form a liquid electrolyte film. When this liquid electrolyte film comes into contact with the delayed addition solid electrolyte 118, the electrolyte 118 begins to gradually melt and to dissolve into the liquid electrolyte film. The electrolyte 118 dissolved in the film is then drawn into the pores of the cathode electrode 106 by capillary forces. Thereafter, the electrolyte 118 redistributes within the fuel cell thus supplementing the electrolyte inventory of the cell. Such delayed gradual melting and absorption of the delayed addition electrolyte 118 allows the electrolyte to be added to the active cell components over time and after a portion of the initial baseline electrolyte inventory has been consumed.

As mentioned above, the delayed addition electrolyte 118 may be placed in the active area 117b of the current collector 110 as well as the wet seal area 116b. The wet seal area 116b typically forms a significant volume of unutilized space and thus can also be effectively used for storing the electrolyte 118. For example, a fuel cell having 2 feet by 4 feet cell area is capable of storing more than 100 grams of delayed addition electrolyte 118 in the active area 117b of the current collector 110 and an additional 50 g of delayed addition 118 in the wet seal area 116b.

As can be appreciated, the wet seal area 116b is located farther away from the cathode electrode 106 relative to the active area 117b and is not in direct contact with the cathode electrode 106. Therefore, transfer through the baseline liquid electrolyte film on the surface of the cathode current collector 110 takes much longer in the wet seal area 116b than in the active area 117b. As a result, the delayed release and addition of the delayed addition electrolyte 118 from the wet seal area 116b is significantly slower than the addition of the electrolyte 118 from the active area 117b. In particular, the electrolyte 118 in the active area 117b of the cathode current collector 110 can be used to replenish the fuel cell liquid electrolyte inventory during the first six months of operation, while the electrolyte 118 in the wet seal area 116b can be used to replenish the electrolyte inventory thereafter. Such gradual addition of the delayed addition electrolyte 118 over long periods of time avoids the possibility of flooding the anode and cathode electrodes with excess electrolyte.

The addition of the delayed addition electrolyte 118 to the fuel cell components is strongly temperature dependent, and the operating temperature within the cell 101 controls the release or melting rate of the delayed addition electrolyte 118 and thus its absorption into the cathode electrode 106. As above-indicated, lithium carbonate ($Li_2CO_3$) and sodium carbonate ($Na_2CO_3$) are preferable to use as the electrolyte 118 for implementing delayed electrolyte release and addition because the melting rates of these compounds or constituents are sufficiently slow to allow electrolyte addition to take place over the course of the fuel cell operating life. Moreover, the use of lithium carbonate as the delayed addition electrolyte 118 is particularly desirable in fuel cell operation since lithium carbonate is consumed preferentially by corrosion and lithiation reactions of the fuel cell components.

Figure 3:
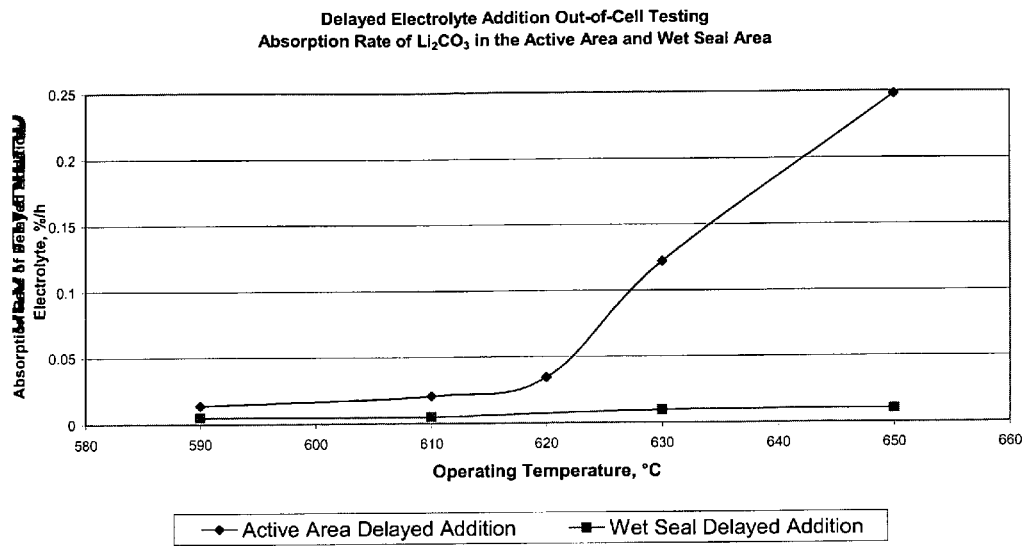
FIG. 3 shows a graph of out-of-cell simulated fuel cell testing electrolyte absorption rate data for delayed addition lithium carbonate electrolyte stored in the active and the wet seal areas of the fuel cell of FIG. 2 at various operating temperatures of the cell.

The absorption rates of lithium carbonate electrolyte from the cathode current collector 110 into the cathode electrode 106 were tested at different temperatures in an out-of-cell testing set up that simulated fuel cell design and operating conditions. The cathode gas used in these tests comprised 17% of $CO_2$, 11% of $O_2$, 12% of $H_2O$ and 60% of $N_2$. FIG. 3 shows a graph of absorption rate data for the lithium carbonate electrolyte 118 being absorbed from the active area 117*b* and from the wet seal areas 116*b* at various operating temperatures between 600 and 660° Celsius. The X-axis in FIG. 3 represents the operating temperature, while the Y-axis represents an hourly absorption rate of the additional electrolyte 118.

As shown, the absorption rate of the electrolyte 118 in the active area 117*b* is significantly affected by the increase in temperature above 620° Celsius, wherein the absorption rate increases from between about 0.015 to 0.03 percent of total lithium carbonate electrolyte absorbed into the cathode electrode per hour at temperatures between 590 and 620° Celsius to 0.25 percent per hour at 650° Celsius. As also shown, the absorption rate of the electrolyte 118 in the wet seal area 116*b*, is also affected by the increasing temperature, although the wet seal area absorption rate is significantly slower than the active area absorption rate. In particular, the absorption rate of the wet seal electrolyte 118 doubles from about 0.005 percent per hour at 590° Celsius to approximately 0.01 percent per hour at 650° Celsius. From the data in FIG. 3, it is apparent that the location of the delayed addition electrolyte 118 in the cathode current collector 110 as well as the operating temperature of the fuel cell will affect the absorption rate of the electrolyte into the cathode 106. Therefore, the amount of liquid electrolyte inventory in the fuel cell being replenished over time is dependent on the location of the delayed addition electrolyte 118 within the current collector 110 and on the fuel cell temperature.

In further accord with the invention, and as discussed in more detail below, delayed addition electrolyte 118 of different carbonate content, e. g, lithium carbonate and sodium carbonate content, may be used in the cathode current collector 110. Also, this electrolyte may be distributed in predetermined areas of the cathode current collector 110 so as to obtain preferred absorption rates of these different electrolyte contents within the fuel cell continuously over the fuel cell lifetime.

Figure 4:
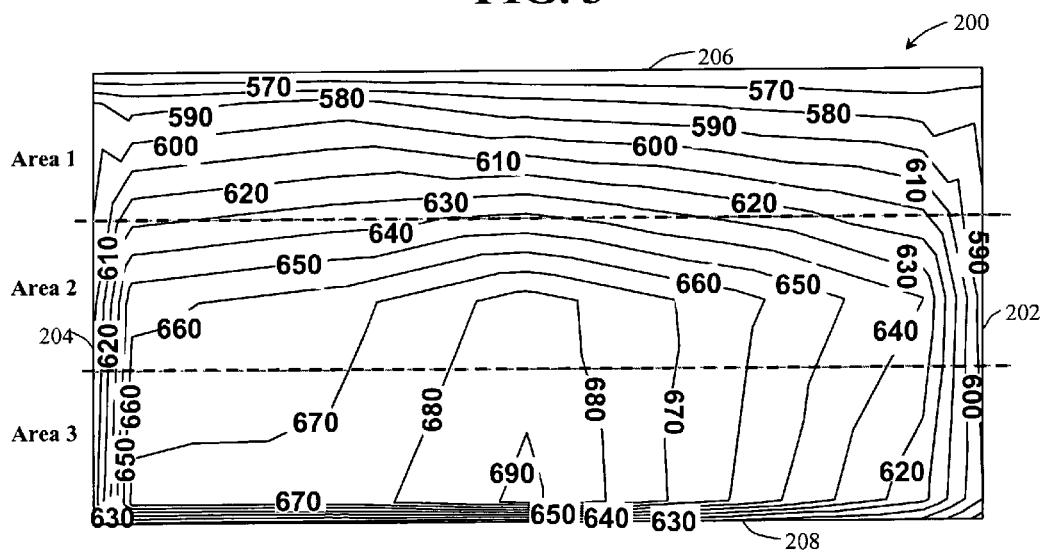
FIG. 4 shows a schematic top view of operating temperature distribution of the fuel cell of FIG. 2 over the area of the cell.

As can be appreciated, the operating temperatures in various locations of the fuel cell 101 typically vary by up to 120° Celsius. This is illustrated in FIG. 4, which shows a schematic top view of a fuel cell 200 and the operating temperature distribution along the area of the fuel cell. As shown, the fuel cell 200 has a cross-flow configuration and includes a fuel inlet side 202, a fuel outlet side 204, an oxidant inlet side 206 and an oxidant outlet side 208. The operating temperatures in the fuel cell range from 570° Celsius to 690° Celsius. In particular, the areas along the oxidant inlet side 206 and the fuel inlet side 202 of the fuel cell are cooler areas of the cell, where the operating temperatures are between 570° and 630° Celsius. A central area 212 of the fuel cell 200 and the area along the oxidant outlet side 208 are hotter areas of the cell with the operating temperatures being between 630° and 690° Celsius.

Accordingly, in accord with the invention, a first content of the delayed addition electrolyte 118 having a first melting point is distributed in the passages of the cathode current collector corresponding to the hotter regions of the cell 200, while a second content of the delayed addition electrolyte 118 having a second melting point lower than the first melting point is distributed in the passages corresponding to the cooler regions. For example, lithium carbonate electrolyte having a melting point of approximately 723° C. may be used as the content of delayed addition electrolyte 118 in the cooler regions of the cell, such as, for example, along the oxidant inlet side 206 and/or along the fuel inlet side 202 of the fuel cell. On the other hand, sodium carbonate electrolyte having a melting point of approximately 858° C., may be used as the content of the delayed addition electrolyte 118 in the passages of the current collector corresponding to the hotter regions of the fuel cell, such as the central region 112 of the cell and/or along the fuel outlet 204 and oxidant outlet 208 sides of the cell 200.

In another illustrative example of the distribution of the different contents of the delayed addition electrolyte 118 in the fuel cell 200, the active area of the cathode current collector is divided into three areas, Area 1, Area 2 and Area 3, as shown in FIG. 4. Area 1, extending along the oxidant inlet side 206 of the cell 200, corresponds to a cooler area of the cell, while Areas 2 and 3 correspond to the hotter areas of the cell. In accord with the invention, electrolyte 118 of lithium carbonate content is provided in Area 1 of the cell, while electrolyte 118 of sodium carbonate content is distributed in Area 2 and Area 3 of the cell. Such pre-selected distribution of the delayed addition electrolyte 118 based on the electrolyte content (melting point) and the local operating temperature of the cell assists in uniform absorption of the electrolyte 118 into the cathode electrode 110 along the entire area of the fuel cell and allows continuous replenishment of the cell's liquid electrolyte inventory over longer periods of cell operation.

The above-described use of the delayed addition electrolyte 118 in the active fuel cell components was tested in fuel cells using pure carbonates as the delayed addition electrolyte 118 at various operating temperatures. The delayed addition electrolyte 118 used in these tests included lithium carbonate and/or sodium carbonate. In particular, the electrolyte 118 was formed as a paste by mixing a predetermined amount of lithium carbonate or sodium carbonate electrolyte powder with a predetermined amount of organic binder, such as Paraloid® B-67 manufactured by Rohm and Haas. Specifically, 77% of lithium carbonate or sodium carbonate was mixed with 7% of organic binder and 16% isopropanol solvent.

The delayed addition electrolyte 118 paste was then applied to the passages in the active area of the current collector 110 in a row pattern. The fuel cell used in these tests had an active area of 250 $cm^2$ and was operated at a current density of 160 $mA/cm^2$ and at 75% oxidant and fuel utilizations. The anode gas passing through the anode side of the fuel cell comprised 73% $H_2$, 18% $CO_2$ and 9% $H_2O$, while the oxidant gas flowing through the cathode side of the fuel cell comprised 19% $CO_2$, 12% $O_2$, 3% $H_2O$ and 66% $N_2$.

In the fuel cell in which the lithium carbonate paste was used as the delayed addition electrolyte 118, all of the electrolyte 118 melted and was absorbed from the current collector 110 into the cathode 106 in less than 500 hours of fuel cell operation at an operating temperature of 650° Celsius. However, with a lower operating temperature of 620° Celsius, 74% of the lithium carbonate melted and was absorbed into the cathode electrode 106 after 2,600 hours of operation. In the cell using sodium carbonate as the electrolyte 118, 69% of the electrolyte 118 melted and was absorbed into the cathode after 2,300 hours of operation at an operating temperature of 650° Celsius.

As can be appreciated, therefore, lithium carbonate electrolyte is more readily absorbed into the cathode than sodium carbonate electrolyte, especially at higher operating temperatures. Therefore, the use of delayed addition electrolyte 118 formed from lithium carbonate is more effective in the cooler regions of the fuel cell, i.e. 590° to 620° Celsius, while the use of delayed addition electrolyte 118 formed from sodium carbonate is more effective in the hotter regions, i.e. 620° to 670° Celsius, of the fuel cell.

Figure 5:
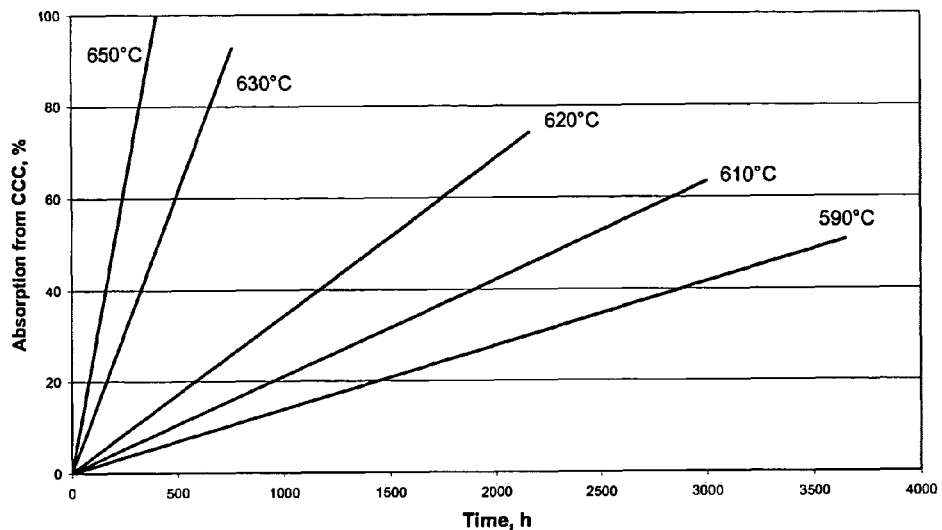
FIG. 5 shows a graph of out-of-cell simulated fuel cell testing absorption data for delayed addition lithium carbonate electrolyte stored in the active area of the cathode current collector of the fuel cell of FIG. 2 at different temperatures.
Figure 6:
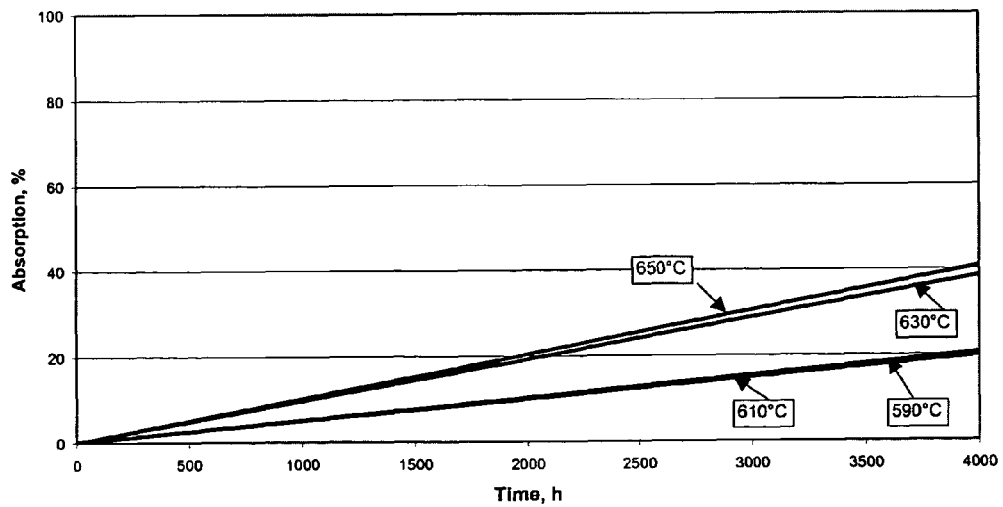
FIG. 6 shows a graph of out-of-cell simulated fuel cell testing absorption data for delayed addition lithium carbonate electrolyte stored in the wet seal area of the cathode current collector of the fuel cell of FIG. 2 at different temperatures.

The absorption rates of lithium carbonate previously described and presented in FIG. 3 derive from the experimental data presented in FIG. 5 and FIG. 6. FIG. 5 shows a graph of absorption data of the lithium carbonate electrolyte from the active area of the cathode current collector at various temperatures, while FIG. 6 shows an absorption data graph of the lithium carbonate electrolyte from the wet seal area of the current collector at different temperatures.

As shown in FIG. 5, in the active area of the cathode current collector, 100% of the lithium carbonate electrolyte is absorbed after approximately 400 hours of fuel cell operation at the operating temperature of 650° Celsius, and more than 90% of the electrolyte is absorbed after about 700 hours of operation at the operating temperature of 630° Celsius. As also shown, the absorption rate of the lithium carbonate electrolyte was significantly reduced at lower temperatures. In particular, after 2,000 hours of operation, about 70% of the electrolyte was absorbed at the operating temperature of 620° Celsius, about 42% of the electrolyte was absorbed at the operating temperature of 610° Celsius and less than 30% of the electrolyte was absorbed at the temperature of 590° Celsius. These results again show that due to the higher absorption rate of lithium carbonate, the delayed addition electrolyte formed from lithium carbonate is more effective when it is used in the cooler regions of the active area of the current collector 110.

As shown in FIG. 6, the absorption rate of lithium carbonate electrolyte 118 from the wet seal area of the cathode current collector is significantly slower than from the active area. As can be seen, the absorption rate of the electrolyte from the wet seal area at the operating temperature of 650° Celsius is slightly higher than the absorption rate at the operating temperature 630° Celsius, wherein about 41% of the lithium carbonate is absorbed from the wet seal area after about 4,000 hours of operation at 650° Celsius and about 38% of the lithium carbonate is absorbed after about 4,000 hours at the operating temperature of 630° Celsius. However, it can also be seen that the absorption rate is much lower at the operating temperatures of 610° and 590° Celsius, where about 20% of the lithium carbonate is absorbed over a period of 4,000 hours of operating time. These results, therefore, show, as above-indicated, that the absorption rate of the delayed addition electrolyte 118 is not only temperature dependent but is also affected by the storage location of the electrolyte within the cathode current collector.

The absorption rate of electrolyte was also tested in a fuel cell using an off-eutectic electrolyte mixture to form the delayed addition electrolyte. The off-eutectic electrolyte mixture used for forming the delayed electrolyte addition comprised 80% $Li_2CO_3$ and 20% $K_2CO_3$ and was stored in the cathode current collector of the fuel cell. The testing was performed in lab-scale sized fuel cells operating at a temperature of about 650° Celsius.

Figure 7:
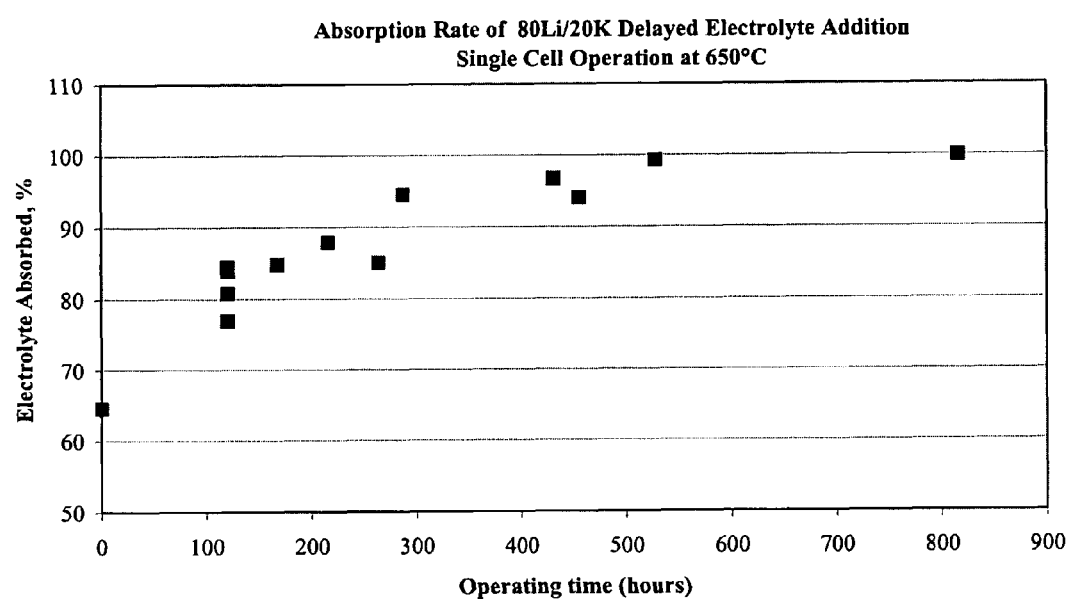
FIG. 7 shows a graph of absorption data for off-eutectic delayed electrolyte addition in a lab-scaled sized fuel cell.

FIG. 7 shows a graph of electrolyte absorption data of the off-eutectic electrolyte from the cathode current collector of the single cell tested. In FIG. 7, the X-axis represents the operating time of the cell while the Y-axis represents the total electrolyte absorbed from the cathode current collector. As can be seen in FIG. 7, at the start of the operation of the fuel cell, i.e. at the operating time 0 hours, about 65% of the electrolyte has been absorbed from the cathode current collector. This is due to the melting and absorption of a eutectic part of the off-eutectic electrolyte mixture in the cathode current collector during the initial heat-up of the fuel cell. As discussed above, after the eutectic part of the electrolyte is absorbed, a part of the electrolyte left in the cathode current collector comprises substantially pure $Li_2CO_3$, i.e. approximately 99.5% $Li_2CO_3$, which forms the delayed addition electrolyte. As shown in FIG. 7, this delayed addition electrolyte is absorbed from the cathode current collector over a period of approximately 820 hours of fuel cell operating time. These results, therefore, show that the off-eutectic electrolyte mixtures are suitable for forming the delayed addition electrolyte, even at high fuel cell operating temperatures.

It should be noted that in the cases shown and described above the delayed addition electrolyte 118 is disposed in the passages of the cathode current collector 110. However, it is contemplated within the scope of the invention that the additional electrolyte may be placed in the passages formed by the anode current collector 108 or in the passages of both the anode and the cathode current collectors, or in passages formed by the bipolar plates.

In all cases it is understood that the above-described arrangements are merely illustrative of the many possible specific embodiments, which represent applications of the present invention. For example, the electrolyte 118 may be formed from compounds or content other than lithium carbonate and sodium carbonate, which have a melting point higher than the highest temperature in operating temperature range of the fuel cell. Numerous and varied other arrangements can be readily devised in accordance with the principles of the present invention without departing from the spirit and scope of the invention.

What is claimed is:

1. Apparatus comprising:
a non-electrode, non-matrix fuel cell component to be disposed within a fuel cell, the non-electrode, non-matrix fuel cell component being one of a cathode current collector, an anode current collector and a bipolar plate, the fuel cell being operated in an operating temperature range and storing a baseline carbonate electrolyte in a electrolyte matrix storage area which is abutted by an electrode of the fuel cell, the baseline carbonate electrolyte having a melting point in the operating temperature range of the fuel cell so as to be a liquid in the operating temperature range of the fuel cell, and the non-electrode, non-matrix fuel cell component having: one or more storage areas which are not in direct contact with the electrode and are not in direct contact with the electrolyte matrix storage area when the non-electrode, non-matrix fuel cell component is disposed in said fuel cell; and
a delayed addition solid carbonate electrolyte disposed in one or more of said one or more storage areas, said delayed addition solid carbonate electrolyte being of a pre-selected content so as to have a melting point above the highest temperature in the operating temperature range of the fuel cell so as to obtain delayed time release melting of the delayed addition solid carbonate electrolyte in the operating temperature range of the fuel cell, which is lower than the melting point of the delayed addition solid carbonate electrolyte, during the time when said non-electrode, non-matrix fuel cell component is disposed in said fuel cell.

2. Apparatus in accordance with claim 1, wherein said delayed addition solid carbonate electrolyte is provided by one or more of lithium carbonate electrolyte, sodium carbonate electrolyte, and a non-eutectic part of an off-eutectic electrolyte whose eutectic part has a melting point within the operating temperature range of said fuel cell.

3. Apparatus in accordance with claim 2, wherein said off-eutectic electrolyte comprises one or more of a lithium carbonate/potassium carbonate off-eutectic electrolyte and a lithium carbonate/sodium carbonate off-eutectic electrolyte.

4. Apparatus in accordance with claim 1, wherein said delayed addition solid carbonate electrolyte has a first solid carbonate electrolyte content with a first delayed time release melting in a first one of said one or more storage areas and a second solid carbonate electrolyte content with a second different delayed time release melting in a second one of said one or more storage areas.

5. Apparatus in accordance with claim 4, wherein: said first solid carbonate electrolyte content has a first melting point and said second solid carbonate electrolyte has a second melting point higher than said first melting point.

6. Apparatus in accordance with claim 5, wherein, when said non-electrode, non-matrix fuel cell component is disposed in said fuel cell, said first storage area is located in region of said fuel cell which is at a first local operating temperature in said operating temperature range of said fuel cell and said second storage area is located in region of said fuel cell which is at a second local operating temperature higher than said first local operating temperature in said operating temperature range of said fuel cell.

7. Apparatus in accordance with claim 6, wherein said first solid carbonate electrolyte content comprises lithium carbonate and said second solid carbonate electrolyte content comprises potassium carbonate.

8. Apparatus in accordance with claim 1 wherein: said one or more storage areas in which said delayed addition solid carbonate electrolyte is stored are in one or more of an active area of said fuel cell and a non-active area of said fuel cell when said non-electrode, non-matrix fuel cell component is disposed in said fuel cell.

9. Apparatus in accordance with claim 8, wherein said delayed addition solid carbonate electrolyte is provided by one or more of lithium carbonate electrolyte, sodium carbonate electrolyte, and a non-eutectic part of an off-eutectic electrolyte whose eutectic part has a melting point within the operating temperature range of said fuel cell.

10. Apparatus in accordance with claim 9, wherein said off-eutectic electrolyte comprises one or more of a lithium carbonate/potassium carbonate off-eutectic electrolyte and a lithium carbonate/sodium carbonate off-eutectic electrolyte.

11. Apparatus in accordance with claim 7, wherein: said delayed addition solid carbonate electrolyte has a first solid carbonate electrolyte content with a first delayed time release melting in a first one of said one or more storage areas and a second solid carbonate electrolyte content with a second different delayed time release melting in a second one of said one or more storage areas; said first solid carbonate electrolyte content has a first melting point and said second solid carbonate electrolyte has a second melting point higher than said first melting point; when said non-electrode, non-matrix fuel cell component is disposed in said fuel cell, said first storage area is located in region of said fuel cell which is at a first local operating temperature in said operating tempera-ture range of said fuel cell and said second storage area is located in region of said fuel cell which is at a second local operating temperature higher than said first local operating temperature in said operating temperature range of said fuel cell.

12. Apparatus in accordance with claim 11, wherein: said first solid carbonate electrolyte content comprises lithium carbonate and said second solid carbonate electrolyte matrix content comprises potassium carbonate.

13. Apparatus in accordance with any one of claims 1 and 2-12, further comprising other components assembled with said non-electrode, non-matrix fuel cell component to form said fuel cell.

14. A method comprising:
providing a fuel cell having an operating temperature range and including an electrolyte matrix storage area for storing a baseline carbonate electrolyte which has a melting point in the operating temperature range of the fuel cell so as to be a liquid in the operating temperature range of the fuel cell, the electrolyte matrix storage area being abutted by an electrode of the fuel cell, a non-electrode, non-matrix fuel cell component, the non-electrode, non-matrix fuel cell component being one of a cathode current collector, an anode current collector and a bipolar plate and having one or more storage areas which are not in direct contact with the electrode and are not in direct contact with the electrolyte matrix storage area, and a delayed addition solid carbonate electrolyte disposed in one or more of said one or more storage areas, said delayed addition solid carbonate electrolyte being of a pre-selected content so as to have a melting point above the highest temperature in the operating temperature range of the fuel cell so as obtain a delayed time release melting of said delayed addition solid carbonate electrolyte in the operating temperature range of the fuel cell, which is lower than the melting point of the delayed addition solid electrolyte; and
operating said fuel cell in said operating temperature range to obtain said delayed time release melting of said delayed addition solid carbonate electrolyte.

15. A method in accordance with claim 14, wherein: said one or more storage areas in which said delayed addition solid carbonate electrolyte is stored are in one or more of an active area of said fuel cell and a non-active area of said fuel cell.

16. A method in accordance with claim 15, wherein said delayed addition solid carbonate electrolyte is provided by one or more of lithium carbonate electrolyte, sodium carbonate electrolyte, and a non-eutectic part of an off-eutectic electrolyte whose eutectic part has a melting point within the operating temperature range of said fuel cell.

17. A method in accordance with claim 16, wherein said off-eutectic electrolyte comprises one or more of a lithium carbonate/potassium carbonate off-eutectic electrolyte and a lithium carbonate/sodium carbonate off-eutectic electrolyte.

18. A method in accordance with claim 14, wherein: said delayed addition solid carbonate electrolyte has a first solid carbonate electrolyte content with a first delayed time release melting in a first one of said one or more storage areas and a second solid carbonate electrolyte content with a second different delayed time release melting in a second one of said one or more storage areas; said first solid carbonate electrolyte content has a first melting point and said second solid carbonate electrolyte has a second melting point higher than said first melting point; said first storage area is located in region of said fuel cell which is at a first local operating temperature in said operating temperature range of said fuel cell and said second storage area is located in a region of said fuel cell which is at a second local operating temperature higher than said first local operating temperature in said operating temperature range of said fuel cell.

19. A method in accordance with claim 18, wherein said first solid carbonate electrolyte content comprises lithium carbonate and said second solid carbonate electrolyte matrix content comprises potassium carbonate.

20. Apparatus in accordance with claim 1, wherein said one or more storage areas in which said delayed addition solid carbonate electrolyte is stored are in one or more non-active areas of said fuel cell when said non-electrode, non-matrix fuel cell component is disposed in said fuel cell.

21. Apparatus in accordance with claim 20, wherein each of said one or more non-active areas of said fuel cell is a wet seal area.

22. Apparatus in accordance with claim 21, wherein said wet seal area is a pocket formed at the edge of a separator plate of the fuel cell.

23. A method in accordance with claim 15, wherein said one or more storage areas in which said delayed addition solid carbonate electrolyte is stored are in one or more non-active areas of said fuel cell when said non-electrode, non-matrix fuel cell component is disposed in said fuel cell.

24. A method in accordance with claim 23, wherein each of said one or more said non-active areas of said fuel cell is a wet seal area.

25. A method in accordance with claim 24, wherein said wet seal area is a pocket formed at the edge of a separator plate of the fuel cell.

* * * * *